United States Patent [19]

Marz

[11] Patent Number: 4,979,230

[45] Date of Patent: Dec. 18, 1990

[54] UP-CONVERSION HOMODYNE RECEIVER FOR CABLE TELEVISION CONVERTER WITH FREQUENCY OFFSET TO AVOID ADJACENT CHANNEL INTERFERENCE

[75] Inventor: Daniel Marz, Dresher, Pa.

[73] Assignee: General Instrument Corporation, New York, N.Y.

[21] Appl. No.: 445,970

[22] Filed: Dec. 4, 1989

[51] Int. Cl.[5] .......................... H04B 1/30; H04H 1/00
[52] U.S. Cl. ........................................ 455/3; 455/202; 455/314; 455/324; 358/86
[58] Field of Search ............... 455/313, 314, 324, 205, 455/207, 179, 3, 4, 5, 6, 202; 358/86; 375/77

[56] References Cited

U.S. PATENT DOCUMENTS

| | | | |
|---|---|---|---|
| 4,105,868 | 9/1978 | Takahashi et al. | 381/16 |
| 4,464,770 | 9/1984 | Waurer et al. | 375/77 |
| 4,520,507 | 5/1985 | Moon | 358/86 |
| 4,524,389 | 6/1985 | Isoke et al. | 455/202 |
| 4,545,072 | 10/1985 | Skutta et al. | 455/209 |
| 4,642,573 | 2/1987 | Noda et al. | 455/202 |
| 4,776,039 | 10/1988 | Akaiwa | 455/207 |
| 4,817,192 | 3/1989 | Phillips et al. | 455/200 |

Primary Examiner—Reinhard J. Eisenzopf
Assistant Examiner—Lisa D. Charouel
Attorney, Agent, or Firm—Barry R. Lipsitz

[57] ABSTRACT

A carrier is received containing a plurality of signals within a first frequency band, for example television signals within the cable television band. The signals are upconverted to a second frequency band above the first band wherein a selected one of the upconverted signals will reside at an intermediate frequency within the second band. The selected upconverted signal is input to a homodyne detector operating at or near intermediate frequency. In-phase and quadrature signals output from the homodyne detector are digitally processed to recover a baseband signal.

20 Claims, 3 Drawing Sheets

UP-CONVERSION HOMODYNE RECEIVER FOR CABLE TELEVISION CONVERTER WITH FREQUENCY OFFSET TO AVOID ADJACENT CHANNEL INTERFERENCE

BACKGROUND OF THE INVENTION

The present invention relates to communication apparatus, and more particularly to a homodyne receiver for use in a cable television converter or the like.

Homodyne receivers are well known for use in radar applications. Such receivers multiply ("mix") a desired signal by a carrier of the same frequency as the signal. A tunable oscillator, such as a voltage controlled oscillator ("VCO") is used to provide the local oscillator signal providing the mixing frequency. This frequency is mixed with the input signal to provide an in-phase output "I". The local oscillator frequency is also phase shifted by 90° and mixed with the input signal to provide a quadrature output signal "Q". The I and Q signals are processed to recover the desired baseband signal.

Homodyne receivers have not been considered appropriate for use in cable television and similar applications for various reasons. In a homodyne receiver, the frequency spectrum folds over itself when the desired signal is multiplied by a carrier of the same frequency. This result is unacceptable in a television environment, since interference with adjacent television channels would result. Interference also arises within the desired channel.

A standard homodyne receiver also requires that the 90° phase shift between the I and Q signals be tracked throughout the signal recovery process. This is difficult and expensive to do in a cable television converter.

The cable television band currently spans a frequency range of 50-550 MHz. This range is expected to expand to 50-1000 MHz in the future. A homodyne receiver for use in such a frequency range would have to include a tunable local oscillator and phase shifter operable over the entire cable television band. It would be prohibitively costly to provide a tunable oscillator having such an extended range, where the ratio between the highest and lowest frequencies is greater than 10.

Further, it is much more difficult to control phase noise in a homodyne receiver than in a conventional television receiver. Any spurious signal in the demodulated signal must be −60 dBc, since signals of the same frequency (or within the baseband bandwidth limits) will create spurious products in the desired signal. In order to solve this problem, the harmonics of the tunable local oscillator in a homodyne receiver would have to be 60 dB down. Alternately, switchable filtering would have to be used at the output of the receiver. Neither option is economically feasible.

Use of a homodyne receiver in a cable television or similar application is further complicated in that a high degree of isolation would be required from the mixers and the input amplifier since the local oscillator is at the frequency of the desired channel. The requirement for high quality components renders the use of a conventional homodyne receiver too expensive for cable television applications.

One benefit of a homodyne receiver is that it provides I and Q outputs that are susceptible to digital processing. It is desirable to use digital signal processing in a cable television converter to eliminate adjustments and provide a more reliable, less expensive product. Ideally, the use of digital signal processing would enable a cable television converter/descrambler to be designed using a single VLSI integrated circuit chip.

It would be advantageous to provide a homodyne receiver for use in a cable television converter or the like that provides the benefit of digital signal processing, without the substantial disadvantages inherent in conventional homodyne receivers identified above. The present invention provides such a receiver.

SUMMARY OF THE INVENTION

In accordance with the present invention, apparatus is provided for recovering a baseband signal transmitted on a carrier. The received carrier contains a signal within a first frequency band. The signal is converted to an intermediate frequency above the band, and input to a homodyne detector operating at or near the intermediate frequency.

In a preferred embodiment, the signal is a television signal within the cable television band. The carrier is mixed with a tuning frequency generated by a variable frequency local oscillator, thereby converting a selected television channel signal contained on the carrier to the intermediate frequency. Filter means are provided for limiting the signal input to the homodyne detector to the selected television channel signal.

The homodyne detector comprises a signal splitter coupled to split the converted signal into first and second portions. A fixed frequency local oscillator provides an output frequency at or near the intermediate frequency. The output frequency is mixed with the first signal portion to provide an in-phase component I. The local oscillator output is phase shifted by 90°, and mixed with the second signal portion to provide a quadrature component Q.

At the output of the homodyne detector, analog to digital converter means are provided for converting the I and Q components to digital signals. The digital signals are processed to provide a demodulated video signal for input to a television set or the like.

In a preferred embodiment, the first frequency band is the cable television band and comprises a range of about 50 MHz to 550 MHz. The intermediate frequency is at least 1 gigahertz ("GHz") and preferably is about 2 GHz with the homodyne detector operating at about 2.002 GHz.

Typically, the received carrier will contain a plurality of signals in the first frequency band that are upconverted by the apparatus to a second frequency band above the first band. The second frequency band may be chosen, for example, such that the ratio of the highest frequency signal to the lowest frequency signal therein is less than 2.5.

The present invention also provides a method for using a homodyne detector as described above to recover a signal transmitted on a carrier.

DETAILED DESCRIPTION OF THE INVENTION

In accordance with the present invention, signals transmitted within a first frequency band are upconverted to a frequency band outside of the first frequency band for processing in a homodyne receiver. For example, the cable television band of 50 MHz to 550 MHz can be upconverted to 2.050 GHz to 2.550 GHz. In the higher frequency band the ratio of the highest frequency signal (2.55 GHz) to the lowest frequency signal (2.05 GHz) is 1.24. This compares favorably to the original ratio of 11 (550/50) and obviates the need for a tunable local oscillator and phase shifter having an extended range. The translation of the received signal to a higher frequency band also reduces or eliminates concerns about interfering harmonics resulting from the operation of a homodyne receiver.

Figure 1:
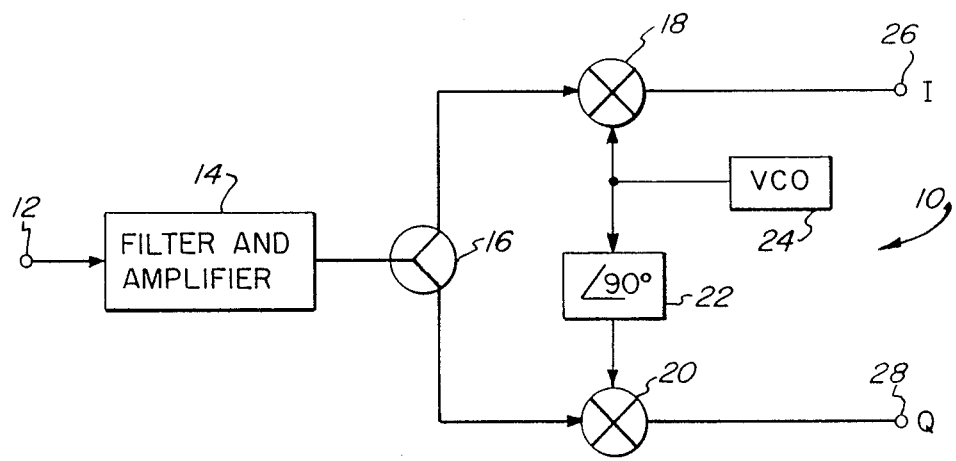
FIG. 1 is a block diagram of a prior art homodyne receiver.

A prior art homodyne receiver 10 is illustrated in FIG. 1. A received signal is input at terminal 12 to a filter and amplifier 14 of conventional design. The filtered and amplified signal is split at a splitter 16 into two identical portions. The first portion of the input signal is applied to a mixer 18 where it is multiplied by a carrier output from voltage controlled oscillator ("VCO") 24. This carrier has the same frequency as the input signal.

VCO 24 is used to tune a desired signal from a plurality of signals contained in the input signal. Thus, for example, if an input signal at a frequency of 5 GHz is desired to be recovered, VCO 24 will be tuned to 5 GHz to shift the signal to the beginning of the frequency spectra for subsequent recovery of the baseband signal. An in-phase component I of the shifted signal will appear at terminal 26.

At the same time, the mixing frequency output from VCO 24 is shifted 90° by phase shift circuitry 22. The 90° phase shifted signal is input to a second mixer 20 for mixing with the input signal, resulting in the output of a quadrature component Q at terminal 28.

Figure 2:
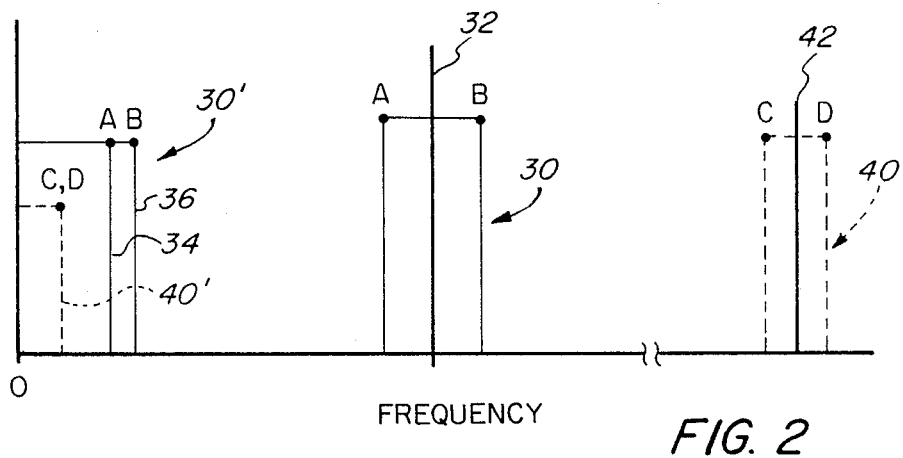
FIG. 2 is a spectral pattern illustrating the operation of the homodyne receiver of FIG. 1.

The operation of the homodyne receiver of FIG. 1 is illustrated on the frequency spectra of FIG. 2. An input signal generally designated 30 is centered about a signal frequency 32. The local oscillator frequency (i.e., "carrier") generated by VCO 24 is also at frequency 32. Accordingly, input signal 30 is translated to the beginning of the frequency spectra as shown at 30'. At the same time, the translated spectrum folds over itself as indicated, i.e., signal portion A designated by reference numeral 34 folds over onto signal portion B indicated by reference numeral 36. Those skilled in the art will appreciate that points A and B can be at the same or different frequencies depending on the type of modulation.

FIG. 2 also illustrates a signal 40 that appears at the second harmonic 42 of the local oscillator frequency. At the beginning of the frequency spectra, this second harmonic 40' falls into the same portion of the spectrum as the desired input signal 30'. Such interference cannot be tolerated in cable television applications. Accordingly, it has been generally accepted that homodyne receivers are not appropriate for use in cable television and similar applications.

Figure 3:
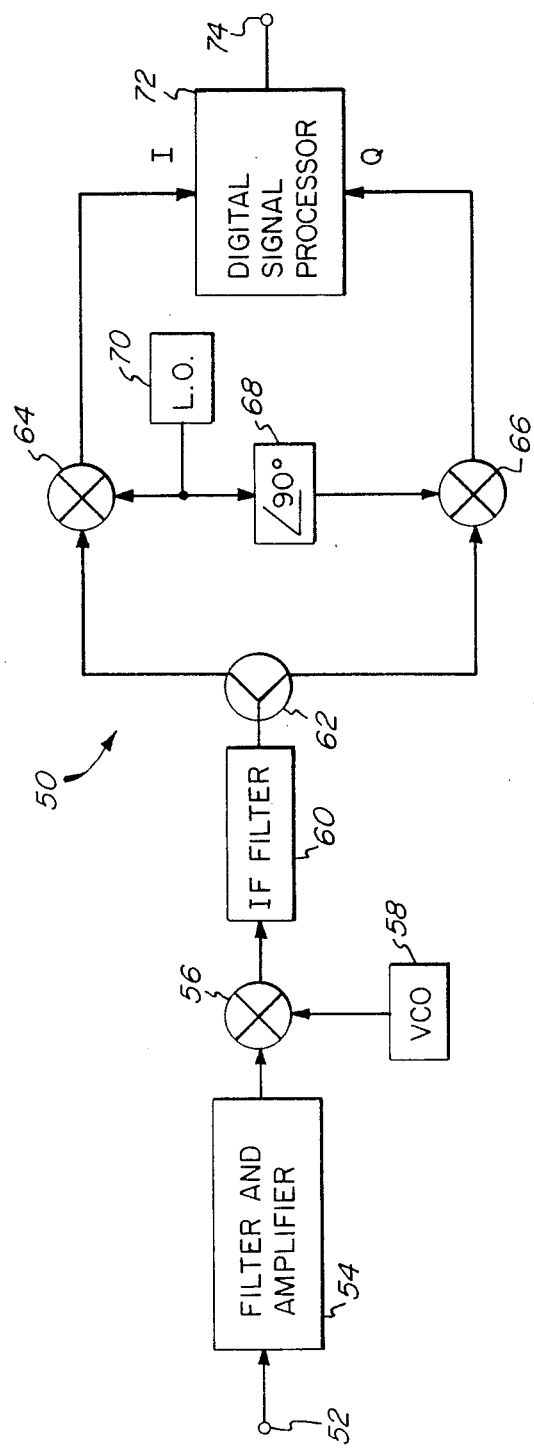
FIG. 3 is a block diagram illustrating a homodyne receiver for use in a cable television converter or the like according to the present invention.

The present invention, as illustrated in FIG. 3, overcomes the drawbacks of a conventional homodyne receiver and enables the use of homodyne reception in a cable television environment. A modified homodyne detector generally designated 50 receives a desired input signal at an intermediate frequency above the frequency band in which the input signal is transmitted. The input signal is received at terminal 52, and filtered and amplified in conventional circuitry 54. In accordance with the present invention, a tuning frequency present at the output of tunable oscillator 58 (for example, a VCO) is mixed with the input signal at mixer 56. The purpose of oscillator 58 and mixer 56 is to upconvert the incoming signal spectrum to a frequency band above that of the incoming signal. For example, where input terminal 52 receives an incoming band of signals at cable television frequencies (e.g., 50-550 MHz) homodyne detector 50 must operate far enough above this band to avoid harmonic distortion of the television channel signals upon detection. Thus, for example, oscillator 58 can be tunable from 2.05 to 2.55 GHz to enable the translation of any selected television channel within the 50-550 MHz band to an intermediate frequency of 2.0 GHz. If it is desired to select television channel 3, which resides in a 6 MHz channel commencing at 60 MHz, oscillator 58 is tuned to 2.06 GHz for recovery of the channel 3 signal at the 2.0 GHz intermediate frequency. It is noted that the range of oscillator 58 need only be 1.24:1 to provide the swing from 2.05 to 2.55 GHz. This swing enables tuning over the entire 50-550 MHz CATV band.

An IF filter 60 receives the upconverted spectrum received from mixer 56 and outputs a single channel to homodyne detector 50. In the example given, IF filter 60 is tuned to eliminate most of the undesired spectrum and pass the channel signal appearing at the intermediate frequency of 2.0 GHz. given, IF filter 60 is tuned to pass only the channel signal appearing at the intermediate frequency of 2.0 GHz.

The desired, upconverted channel signal is split at a splitter 62 into first and second portions. The first portion of the signal is input to a mixer 64. The second portion is input to a mixer 66. A fixed local oscillator 70 provides a carrier for mixing with the upconverted channel signal. The carrier frequency is at or near the intermediate frequency passed by IF filter 60. In a preferred embodiment where the intermediate frequency is 2.0 GHz, local oscillator 70 is tuned to 2.002 GHz so that the desired television channel signal processed by homodyne detector 50 will end up folded on the frequency spectrum for recovery without interference from an adjacent channel. As indicated in FIG. 3, the output of local oscillator 70 directly feeds mixer 64. The local oscillator output is shifted 90° by phase shifting circuitry 68 before input to mixer 66. The resultant I and Q components are input to a digital signal processor 72 for recovery of the original video signal. The recovered video signal is output to a television receiver or the like on output terminal 74.

It is noted that in the homodyne detector of FIG. 3, a fixed local oscillator 70 is provided and tuning of a desired channel occurs at mixer 56, which is prior to the homodyne detector. Although the circuit of FIG. 3 requires two separate oscillators, only one high quality mixer 56 is required. Mixers 64 and 66 can be simple mixers (e.g., dual gate mosfets, mesfets, or bipolar devices) instead of the high quality mixers required in conventional homodyne receivers such as that shown in FIG. 1.

Figure 4:
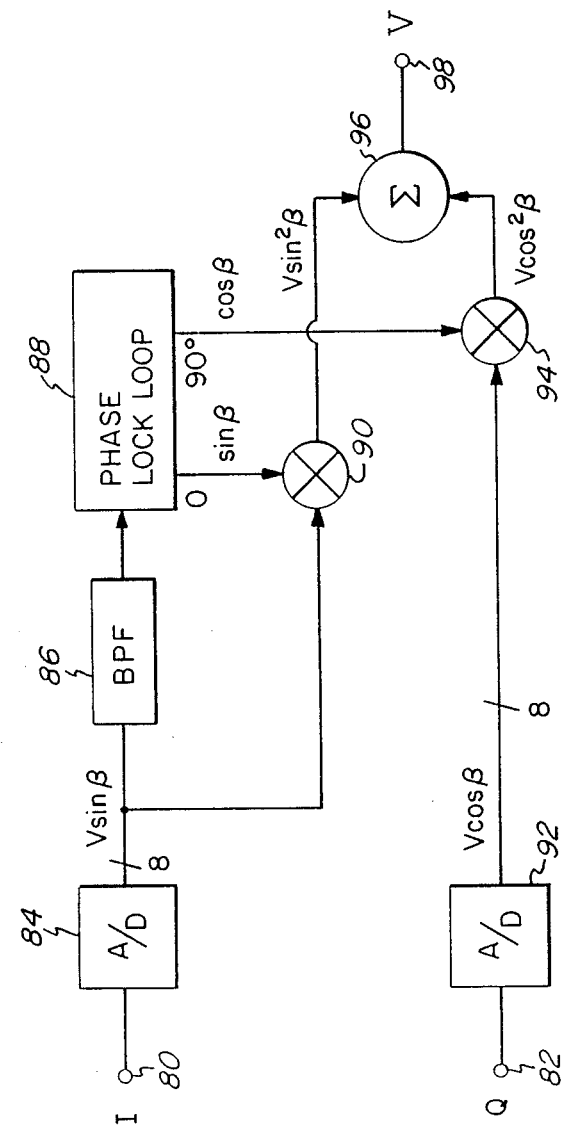
FIG. 4 is a block diagram illustrating one embodiment of a digital signal processor that may be used in the receiver of FIG. 3.

FIG. 4 illustrates one example of a digital signal processor 72 in block diagram form. The I component of the detected signal is input from terminal 80 to an analog to digital ("A/D") converter 84 which converts the signal into a digital (e.g., 8 bit) format. The digitized signal can be expressed as $V\sin\beta$, where $\beta = (\Omega_{LO} - \Omega_C)$. $\Omega_{LO}$ is the frequency of local oscillator 70 and $\Omega_C$ is the intermediate frequency.

After A/D conversion, the I signal is passed through a bandpass filter 86. For cable television applications, this filter is tuned to 2.15 MHz. The output of bandpass filter 86 is coupled to a digital phase lock loop 88 that phase locks to the incoming 2.15 MHz signal and generates 0° and 90° components corresponding to $\sin\beta$ and $\cos\beta$. The $\sin\beta$ component is multiplied in a mixer 90 with the $V\sin\beta$ signal from A/D converter 84. The resultant output $V\sin^2\beta$ is input to a summing circuit 96.

The Q component output from homodyne detector 50 is input at terminal 82 to an analog to digital converter 92. The resultant digital signal is equivalent to $V\cos\beta$, and is multiplied by $\cos\beta$ at mixer 94 The resultant $V\cos^2\beta$ signal is input to summing circuit 96. When the $V\sin^2\beta$ and $V\cos^2\beta$ terms are added at summing circuit 96, the resultant output on terminal 98 is the recovered desired signal V.

It will now be appreciated that the present invention provides a method and apparatus for recovering baseband signals in cable television and similar applications using a unique homodyne detector operating in a frequency band above that in which the transmitted signals are located. Properties of prior art homodyne receivers which render them inappropriate for use in cable television applications are overcome by the present invention. The invention provides an economical apparatus for use in a cable television converter or the like that enables digital processing of detected television signals with the attendant advantages thereof.

Although the invention has been described in connection with a preferred embodiment, it will be apparent to those skilled in the art that various modifications and adaptations may be made thereto without departing from the spirit and scope of the invention, as set forth in the following claims.

What is claimed is:

1. Apparatus for recovering a baseband signal transmitted on a carrier comprising:
   means for receiving a carrier containing a signal within a first frequency band;
   means for upconverting said signal to an intermediate frequency sufficiently above said band to prevent harmonic distortion of said signal when recovered at baseband; and
   means for inputting the upconverted signal to a homodyne detector operating at a frequency that is offset above said intermediate frequency by an amount sufficient to translate the signal to baseband with a folded spectrum that avoids interference with adjacent channels.

2. The apparatus of claim 1 wherein said signal is a television signal within the cable television band.

3. The apparatus of claim 2 wherein said converting means comprises a mixer coupled to mix said carrier with a tuning frequency generated by a variable frequency local oscillator for converting a selected television channel signal contained on said carrier to said intermediate frequency.

4. The apparatus of claim 3 further comprising:
   filter means coupled between said converting means and said inputting means for limiting the signal input to the homodyne detector to said selected television channel signal.

5. The apparatus of claim 4 wherein said homodyne detector comprises:
   a signal splitter coupled to split the converted signal into first and second portions;
   a fixed frequency local oscillator having an output frequency offset from said intermediate frequency;
   means for mixing said output frequency with said first signal portion to provide an in-phase component I;
   means for phase shifting the fixed local oscillator output by 90°; and
   means for mixing the 90° phase shifted output with said second signal portion to provide a quadrature component Q.

6. The apparatus of claim 5 further comprising:
   analog to digital converter means for converting said I and Q components to digital signals; and
   means for processing said digital signals to provide a demodulated video signal for input to a video display.

7. The apparatus of claim 1 wherein said first frequency band comprises a range of about 50 MHz to 550 MHz.

8. The apparatus of claim 7 wherein said intermediate frequency is at least 1 GHz.

9. The apparatus of claim 8 wherein said intermediate frequency is about 2 GHz and said homodyne detector operates at about 2.002 GHz.

10. The apparatus of claim 1 wherein said converting means upconverts a plurality of signals contained on said carrier in said first frequency band to a second frequency band above the first band.

11. The apparatus of claim 10 wherein the ratio of the highest frequency signal to the lowest frequency signal in said second band is less than 2.5.

12. A method for recovering a signal transmitted on a carrier comprising the steps of:
   receiving a carrier containing a plurality of signals within a first frequency band;
   unconverting said signals to a second frequency band above said first band wherein a selected one of said upconverted signals will reside at an intermediate frequency within said second band; and
   inputting the selected upconverted signal to a homodyne detector operating at a frequency that is offset above said intermediate frequency by an amount sufficient to translate the signal to baseband with a folded spectrum that avoids interference with adjacent channels.

13. A method according to claim 12 wherein said first frequency band is the cable television band and said signals are television signals.

14. A method according to claim 13 comprising the further step of:
   processing in-phase and quadrature signals output from the homodyne detector to provide a demodulated video signal for input to a video display.

15. A method according to claim 13 wherein said first frequency band comprises a range of about 50 MHz to 550 MHz.

16. A method according to claim 15 wherein said intermediate frequency is at least 1 GHz.

17. A method according to claim 16 wherein said intermediate frequency is about 2 GHz and said homodyne detector operates at about 2.002 GHz.

18. A method according to claim 13 wherein said signals are upconverted to a frequency range where the ratio of the highest frequency signal to the lowest frequency signal in said second band is less than 2.5.

19. The apparatus of claim 1 wherein said homodyne detector operates at a frequency of about 2 MHz above the intermediate frequency.

20. A method according to claim 12 wherein said homodyne detector operates at a frequency of about 2 MHz above the intermediate frequency.

* * * * *